(12) United States Patent
Ng et al.

(10) Patent No.: US 7,548,343 B2
(45) Date of Patent: Jun. 16, 2009

(54) COLOR ENHANCEMENT METHOD AND SYSTEM

(75) Inventors: Yee Seung Ng, Fairport, NY (US);
Hwai-Tzuu Tai, Rochester, NY (US);
Chung-Hui Kuo, Fairport, NY (US);
Dmitri Anatolyevich Gusev, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 321 days.

(21) Appl. No.: 11/262,142

(22) Filed: Oct. 28, 2005

(65) Prior Publication Data
US 2007/0097461 A1    May 3, 2007

(51) Int. Cl.
*G06F 15/00*  (2006.01)
*G06K 15/00*  (2006.01)
*H04N 1/40*  (2006.01)
*G03F 3/08*  (2006.01)
*G06K 9/00*  (2006.01)
*B41J 2/385*  (2006.01)
*B41J 2/325*  (2006.01)

(52) U.S. Cl. ............... 358/1.9; 358/2.1; 358/3.04; 358/518; 382/162; 347/115; 347/172

(58) Field of Classification Search ............... 358/1.9, 358/500, 504, 3.23
See application file for complete search history.

(56) References Cited

U.S. PATENT DOCUMENTS

| | | | |
|---|---|---|---|
| 5,185,661 A | 2/1993 | Ng | |
| 5,234,783 A | 8/1993 | Ng | |
| 5,363,318 A | 11/1994 | McCauley | |
| 5,384,601 A | 1/1995 | Yamashita et al. | |
| 5,781,206 A | 7/1998 | Edge | |
| 5,818,960 A | 10/1998 | Gregory, Jr. et al. | |
| 6,027,201 A * | 2/2000 | Edge | 347/19 |
| 6,121,986 A | 9/2000 | Regelsberger et al. | |
| 6,243,133 B1 | 6/2001 | Spaulding et al. | |
| 6,278,805 B1 | 8/2001 | Gregory, Jr. et al. | |
| 6,480,299 B1 | 11/2002 | Drakopoulos | |

(Continued)

FOREIGN PATENT DOCUMENTS

JP     07 222013     8/1995

(Continued)

OTHER PUBLICATIONS

Jiangtao Kuang, Xiaoyun Jiang, Shuxue Quan, Andrew Chiu; *A psychophysical study on the influence factors of color preference in photographic color reproduction*; Proceeding of SPIE-IS&T, vol. 5668, Jan. 17, 2005.

(Continued)

*Primary Examiner*—Twyler L Haskins
*Assistant Examiner*—Barbara D Reinier
(74) *Attorney, Agent, or Firm*—Donna P. Suchy

(57) ABSTRACT

An apparatus and method for calibrating a multi-color imaging system are provided. Color values are measured for each of the different color patches, and compared to target process-sensitive colors color values, representing a weight-adjusted memory color. An error value is calculated. The error value represents a deviation of the measured color values from the target color values. The input values for each colorant then are independently adjusted to reduce the error value to a predetermined degree.

20 Claims, 12 Drawing Sheets

U.S. PATENT DOCUMENTS

| | | |
|---|---|---|
| RE38,180 E | 7/2003 | Edge |
| 6,791,716 B1 | 9/2004 | Buhr et al. |
| 2004/0227964 A1* | 11/2004 | Fujino ................. 358/1.9 |
| 2007/0071315 A1* | 3/2007 | Uroz et al. ............ 382/162 |

FOREIGN PATENT DOCUMENTS

| | | |
|---|---|---|
| WO | WO 95/22866 | 8/1995 |

OTHER PUBLICATIONS

Zuemei Zhang and David H. Brainard; *Bayesian color correction method for non-colorimetric digital image sensors*; Agilent Technologies Laboratories; Dept. of Psychology, University of Pennsylvania, Nov. 9, 2004.

Maya R. Gupta; *Custom Color Enhancements by Statistical Learning*; University of Washington, Dept. of Electrical Engineering; Seattle, WA 98195, Sep. 2005.

Yee Seung Ng; U.S. Appl. No. 11/155,268; *Method and Apparatus for Electrostatographic Printing With Generic Color Profiles and Inverse Masks Based on Receiver Member Characteristics*; Filed Jun. 17, 2005.

Yee Seung Ng; U.S. Appl. No. 11/062,972; *Method and Apparatus For Electrostatographic Printing With Enhanced Color Gamut*; Filed Feb. 22, 2005.

* cited by examiner

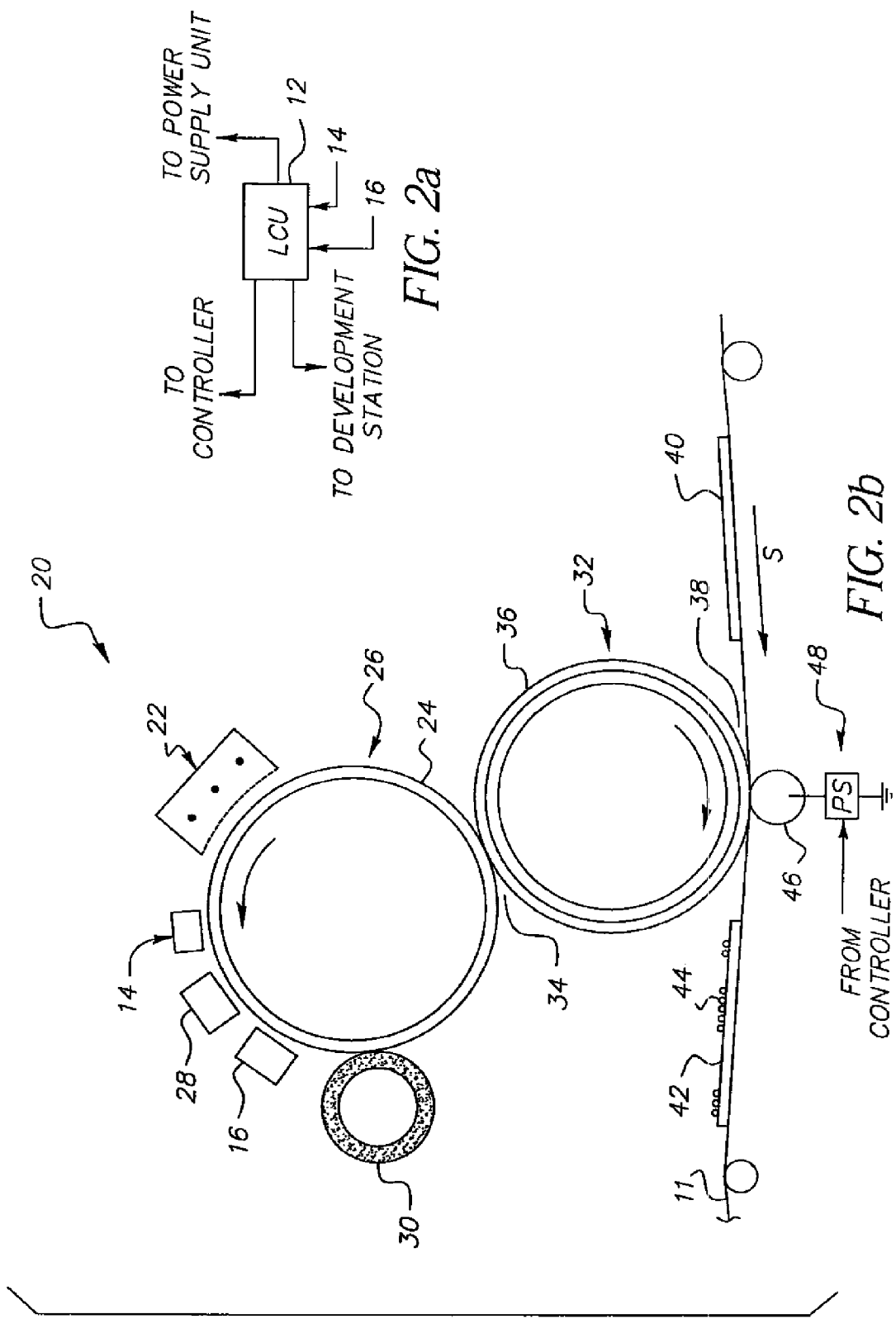

COLOR ENHANCEMENT METHOD AND SYSTEM

FIELD OF THE INVENTION

The invention relates to electrographic printers and apparatus thereof. More specifically, the invention is directed to processes and apparatus for enhancing color in digital color reproduction systems.

BACKGROUND

Electrographic printers use a developer mixing apparatus and related processes for mixing the developer or toner used during the printing process. The four-color electrophographic printers, for example, employ the four color toners, cyan, magenta, yellow and black (CMYK) used in the printing process to form a color image. The term "electrographic printer," is intended to encompass electrophotographic printers and copiers that employ dry toner developed on an electrophotographic receiver element, as well as ionographic printers and copiers that do not rely upon an electrophotographic receiver Digital color reproduction printing systems typically include digital front-end processors, digital color printer, and post finishing systems (e.g., UV coating system, glosser system, laminator system, and etc). It reproduces original pleasing color onto substrates (such as paper). The digital front-end processors take input electronic files (such as postscript command files) composed of images from other input devices (e.g., a scanner, a digital camera) together with its own internal other function processors (e.g., raster image processor, image positioning processor, image manipulation processor, color processor, image storage processor, substrate processor, and etc) to rasterizing input electronic file to become proper image bitmaps for printer to print. An operator may be assisted to set up parameters such as layout, font, color, paper, post-finishing, and etc among those digital font-end processors. The printer (e.g., an electrographic printer) takes rasterized bitmap and renders the bitmap into a form that can control the printing process from the exposure device to writing the image onto paper. The post-finishing system puts finishing touch on the prints such as protection, glossing, and binding etc.

In an electrophotographic modular printing machine of known type, for example, the NexPress 2100 printer manufactured by NexPress Solutions, Inc., of Rochester, N.Y., color toner images are made sequentially in a plurality of color imaging modules arranged in tandem, and the toner images are successively electrostatically transferred to a receiver member adhered to a transport web moving through the modules. Commercial machines of this type typically employ intermediate transfer members in the respective modules for the transfer to the receiver member of individual color separation toner images. Of course, in other electrostatographic printers, each color separation toner image is directly transferred to a receiver member.

Electrostatographic printers having multicolor capability are known to also provide an additional toner depositing assembly for depositing clear toner. The provision of a clear toner overcoat to a color print is desirable for providing protection of the print from fingerprints and reducing certain visual artifacts. However, a clear toner overcoat will add cost and may reduce color gamut of the print; thus, it is desirable to provide for operator/user selection to determine whether or not a clear toner overcoat will be applied to the entire print. In U.S. Pat. No. 5,234,783, issued on Aug. 10, 1993, in the name of Yee S. Ng, it is noted that in lieu of providing a uniform layer of clear toner, a layer that varies inversely according to heights of the toner stacks may be used instead as a compromise approach to establishing even toner stack heights. As is known, the respective color toners are deposited one upon the other at respective locations on the receiver member and the height of a respective color toner stack is the sum of the toner contributions of each respective color and provides the print with a more even or uniform gloss.

In U.S. patent application Ser. No. 11/062,972, filed on Feb. 22, 2005, in the names of Yee S. Ng et al., a method is disclosed of forming a print having a multicolor image supported on a receiver member wherein a multicolor toner image is formed on the receiver member by toners of at least three different colors of toner pigments which form various combinations of color at different pixel locations on the receiver member to form the multicolor toner image thereon; forming a clear toner overcoat upon the multicolor toner image, the clear toner overcoat being deposited as an inverse mask; pre-fusing the multicolor toner image and clear toner overcoat to the receiver member to at least tack the toners forming the multicolor toner image and the clear toner overcoat; and subjecting the clear toner overcoat and the multicolor toner image to heat and pressure using a belt fuser to provide an improved color gamut and gloss to the image. The inverse masks, the pre-fusing conditions, and the belt fuser set points can be optimized based on receiver member types to maximize the color gamut. However, due to the significant change in the color gamut, new color profiles will need to be built for each receiver member used to obtain the desired color.

Color shift is quite common in electrophographic printing systems during long printing projects runs. The system environment can change when components, such as the fuser roller, change their operational characteristics over time. Typically linearization processes are used to re-calibrate the printer system to its correct status so that digital front-end processors are more independent from printer behavior change. However, in the whole color reproduction printing system, which includes both printer and post finishing system (e.g., UV coater, glosser, and etc), the linearization process alone cannot fully correct the whole color reproduction system variability. If the resultant colors especially memory sensitive colors were incorrectly shifted (for example, red shift or green shift), they would be poorly perceived and unacceptable. These are important colors that are very visible to customers. It is important to make corrections and adjustments to recreate the desired perceived memory colors. [Ref: A psychophysical study on the influence factors of color preferences in photographic color reproduction; Proceeding of SPIE-IS&T, vol. 5668]

Previously the "tweaking of color" has been performed manually. However, a manual "color tweaking" process is tedious and only addresses some specific colors that customers are very sensitive to when they view their prints. This invention anticipates this problem and can overcome this shortcoming of previous printing systems by weighting the important process-sensitive colors in such a way that includes all important memory sensitive colors in an automated process that takes into account all-important process-sensitive colors and dynamically adjusts the system to the desired parameters.

The present invention overcomes this shortcoming by correcting the imbalances that can occur in printing colors such as process-sensitive colors in a color reproduction printing system. The apparatus and related method describe correcting color with customer adjustable weights among process-sensitive colors desired by individual customers. The following invention solves the current problems with representation of process-sensitive colors, such as memory sensitive colors, neutral colors, black and primary colors in a wide variety of situations.

SUMMARY OF THE INVENTION

The invention is in the field of color reproduction printing systems, which include digital front-end processors, color printers and post-finishing system such as UV coater, glosser, laminator, and etc. More specifically, the invention relates to an automatic correction and enhancement of the representation of process-sensitive colors, such as memory sensitive colors, neutral colors, black and primary colors on a substrate that process through the color reproduction system by adjusting shifted colors back to their target colors.

BRIEF DESCRIPTION OF THE DRAWINGS

FIGS. 2A and 2B are schematic illustrations of a representative printing assembly or module used in the print engine apparatus of FIG. 1 showing additional details.

DETAILED DESCRIPTION

Figure 1:
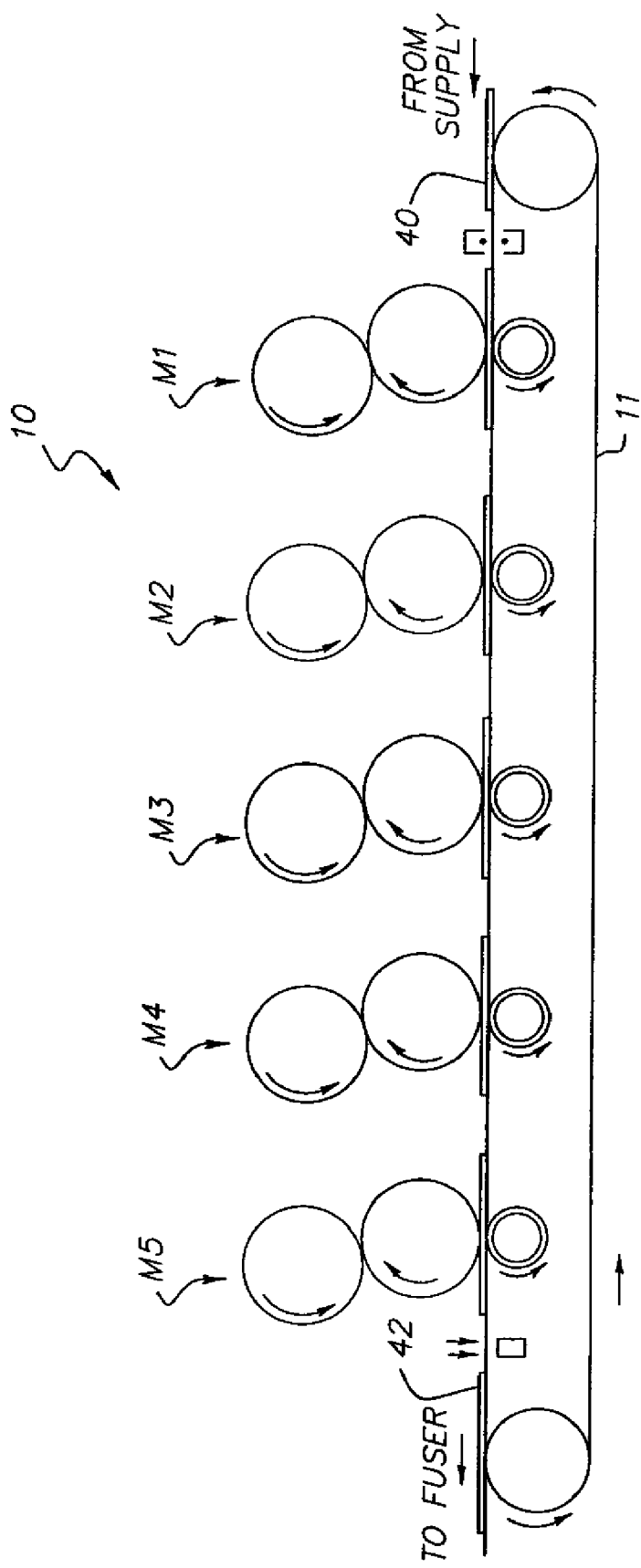
FIG. 1 is a schematic illustration of an electrophotographic print engine or printer apparatus, having a plurality of printing assemblies or modules that may be used in accordance with the present invention.

FIG. 1 is a side elevational view schematically showing portions of an electrophotographic print engine or printer apparatus 10 suitable for printing multicolor toner images on receiver members. A plurality of colors may be combined on a single receiver member using electrographic printers. The term "electrographic printer," is intended to encompass electrophotographic printers and copiers that employ dry toner developed on an electrographic receiver element, as well as ionographic printers and copiers that do not rely upon an electrographic receiver. The color electrophographic printer shown in FIG. 1 employs a plurality of color toner modules (represented for reference only in FIG. 1 as M1-M5), such as the CMYK toner system, in conjunction with printing on a substrate that travels along a transport web 11. Each of the modules generates a single-color toner image for transfer to a receiver member successively moved through the modules. The modules can also be used to provide a clear toner overcoat as described in co-pending application Ser. No. 11/155,268. Each receiver member, during a single pass by the modules, can have transferred in registration thereto, for a plurality of single-color toner images to form a multicolor image with a clear toner overcoat or other desired application. As used herein, the term multicolor implies that in an image formed on the receiver member has combinations of subsets of primary colors combined to form other colors on the receiver member, at various locations on the receiver member. The primary colors participate to form process colors in at least some of the subsets, wherein each of the primary colors may be combined with one more of the other primary colors at a particular location on the receiver member to form a color different than the specific color toners combined at that location.

FIG. 2A shows a Logic and Control Unit (LCU) 12 including one or more computers acting in response to signals from various sensors associated with the apparatus and provide timing and control signals to the respective components to control the various components and process control parameters of the apparatus in accordance with methods well known by those skilled in the arts. Printer 10 includes a controller or logic and control unit (LCU) 12, preferably a digital computer or microprocessor operating according to a stored program for sequentially actuating the workstations within printer 10, effecting overall control of printer 10 and its various subsystems. LCU 12 also is programmed to provide closed-loop control of printer 10 in response to signals from various sensors and encoders. Aspects of process control are described in U.S. Pat. No. 6,121,986 incorporated herein by this reference.

The LCU 12 includes a microprocessor and suitable tables and control software which is executable by the LCU 12. The control software is preferably stored in memory associated with the LCU 12. Sensors associated with the fusing and glossing assemblies provide appropriate signals to the LCU 12 when the glosser is integrated with the printing apparatus. In any event, the glosser can have separate controls providing control over temperature of the glossing roller and the downstream cooling of the fusing belt and control of glossing nip pressure. In response to the sensors, the LCU 12 issues command and control signals that adjust the heat and/or pressure within fusing nip (not shown) so as to reduce image artifacts which are attributable to and/or are the result of release fluid disposed upon and/or impregnating a receiver member that is subsequently processed by/through a finishing device such as a glossing assembly (not shown). Additional elements provided for control may be assembled about the various module elements, such as for example a meter 14 for measuring the uniform electrostatic charge and a meter 16 for measuring the post-exposure color within a patch area of an image area on the printed surface.

FIG. 2B shows a representative color-printing module. Each color-printing module 20 of the printer apparatus includes a plurality of electrophotographic imaging subsystems for producing a respective single-color toned image. Included in each module is a primary charging subsystem 22 for uniformly electrostatically charging a surface 24 of a photoconductive imaging member 26, shown in the form of an imaging cylinder. Also included is an exposure subsystem 28 for image modulation of the uniform electrostatic charge by exposing the photoconductive imaging member to form a latent electrostatic color separation image in the respective color; a development subsystem 30 for toning the exposed photoconductive imaging member with toner of the respective color; an intermediate transfer member 32 for transferring the respective color separation image from the photoconductive imaging member through a transfer nip 34 to the surface 36 of the intermediate transfer member 32, and through a second transfer nip 38 from the intermediate transfer member to a receiver member (receiver member 40 shown prior to entry into the second transfer nip 38. Also shown is receiver member 42, shown subsequent to the transfer of the toned color separation image after receiving the respective toned color separation images 44 in superposition to form a composite multicolor image thereon. An electrostatic field provided to a backup roller 46 from a power source 48 effects transfer to the receiver member. All the modules are substantially identical to the above-described module. Some of the modules transfer a type of pigmented toner and others non-pigmented toner, such as a clear toner or some other transfer material or a combination of pigmented and non-pigmented toner.

In an alternative embodiment, the photoconductive imaging member 26 can alternatively have the form of an endless web, and the intermediate transfer member 32 may also be an endless web, although it is preferred to be a compliant roller of a well-known type. The exposure device may include a Light Emitting Diode (LED) writer or laser writer or other electro-optical or optical recording element. Charging device 22 can be any suitable device for producing uniform pre-exposure potential on photoconductive imaging member 26, the charging device including, for example, any type of corona charger or roller charger. A cleaning device may be associated with the surface 24 of the photoconductive image recording member, and another cleaning device may be associated with the surface 36 of the intermediate transfer member after respective transfer of the toned images. Still other forms of electrostatographic recording apparatus may be used to form the multicolor image, and such apparatus need not have the color assemblies arranged in a tandem form as described herein.

The electrostatic image is developed, preferably using the well known discharged area development technique, by application of pigmented marking particles to the latent image bearing photoconductive drum by the respective exposure subsystem 28, which development subsystem 30 can employ Small Particle Dry (SPD) developers. A suitable voltage, to develop the respective latent image, electrically biases each of the development assemblies. The voltage may be supplied by a power supply or by individual power supplies (not illustrated). Preferably, the respective developer is a two-component developer that includes toner marking particles and magnetic carrier particles. Each color development assembly has a particular color of pigmented toner marking particles associated respectively therewith for toning. Thus, each of the modules, M1 through M4, creates a different color marking particle image on the respective photographic drum. Alternatively, the developer may be a single-component developer. It is also contemplated that the color toners may each be associated with a liquid developer. As will be discussed further below, a clear toner development assembly may be substituted for one of the pigmented developer assemblies so that the fifth module operates in similar manner to that of the other modules which deposits pigmented toner; however, the development assembly of the clear toner module has toner particles associated respectively therewith that are similar to the toner marking particles of the color development assemblies but without the pigmented material incorporated within the toner.

As indicated above, the color printer can employ four different colorants (cyan, magenta, yellow, black), three different colorants (red, green, blue), or multiple colorants (cyan, magenta, yellow, black, red, green, blue) to form variety of colors. These colorants represent CMYK colors, RGB colors or multiple colors in device-dependent color space. This means that color generated or displayed within these spaces are directly linked to a specific printer, ink, media, reproduction process or combination thereof. The RGB space of one manufacture monitor may be different than that in the RGB space of another manufacture monitor. The CMYK space of one manufacture-printing device may be different from the CMYK space of another manufacture-printing device. These CMYK, RGB, or multiple colors may be characterized by its lightness, saturation, and hue. One commonly used color measurement system is the device-independent color space CIELAB also known as the LAB response wherein the "L" represents the lightness of the color, the "a" represents the location of the color on a spectrum from red to green, and the "b" represents the location of the color on a spectrum from yellow to blue. The "a" and "b" taken together represent the saturation and hue of the color. Note that the notation L* a* b* will also be used to refer to individual coordinates of the LAB color system.

Figure 7:
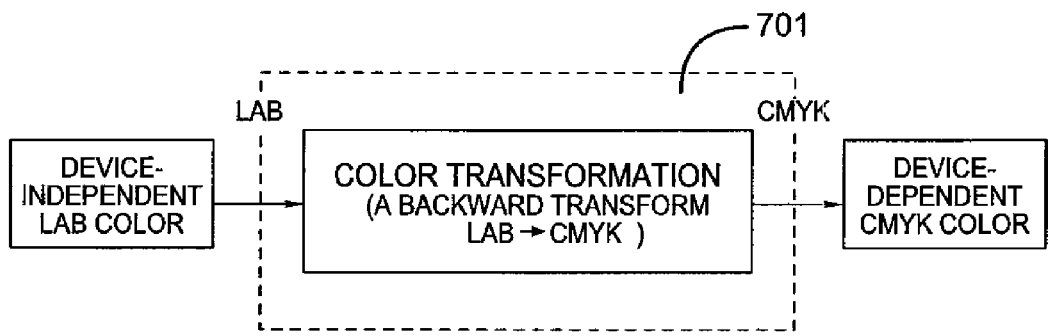
FIG. 7 is a LAB to CMYK color transformation in a four-color printer, also called a backward transform from printing process point of view.
Figure 8:
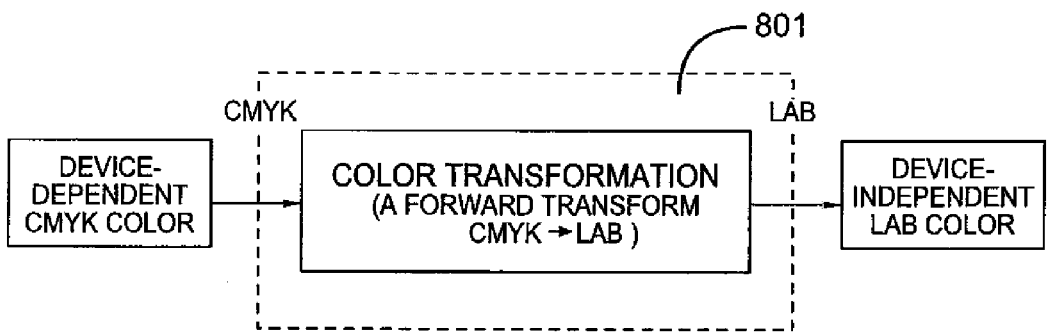
FIG. 8 is a CMYK to LAB color transformation in a four-color printer, also called a forward transform from printing process point of view.

The color printing system needs to be calibrated and characterized for accurate color reproduction. These include setup of the printer to the specification for each color separation and printed large number of test patches to construct proper color transformation. The color transformation that characterizes the printing system maps color between device-dependent color and device-independent color. For example, it transforms the device independent color system LAB data, defined above, into CMYK data, for example as shown in FIG. 7, and vice versa, for example as shown in FIG. 8. The color transforms are stored in a look-up table (LUT) format, in general, for easy access in processing color data. The International Color Consortium (ICC) color profile, which characterizes the printing system, contains multiple color transformation tables in LUT form.

Figure 3A:
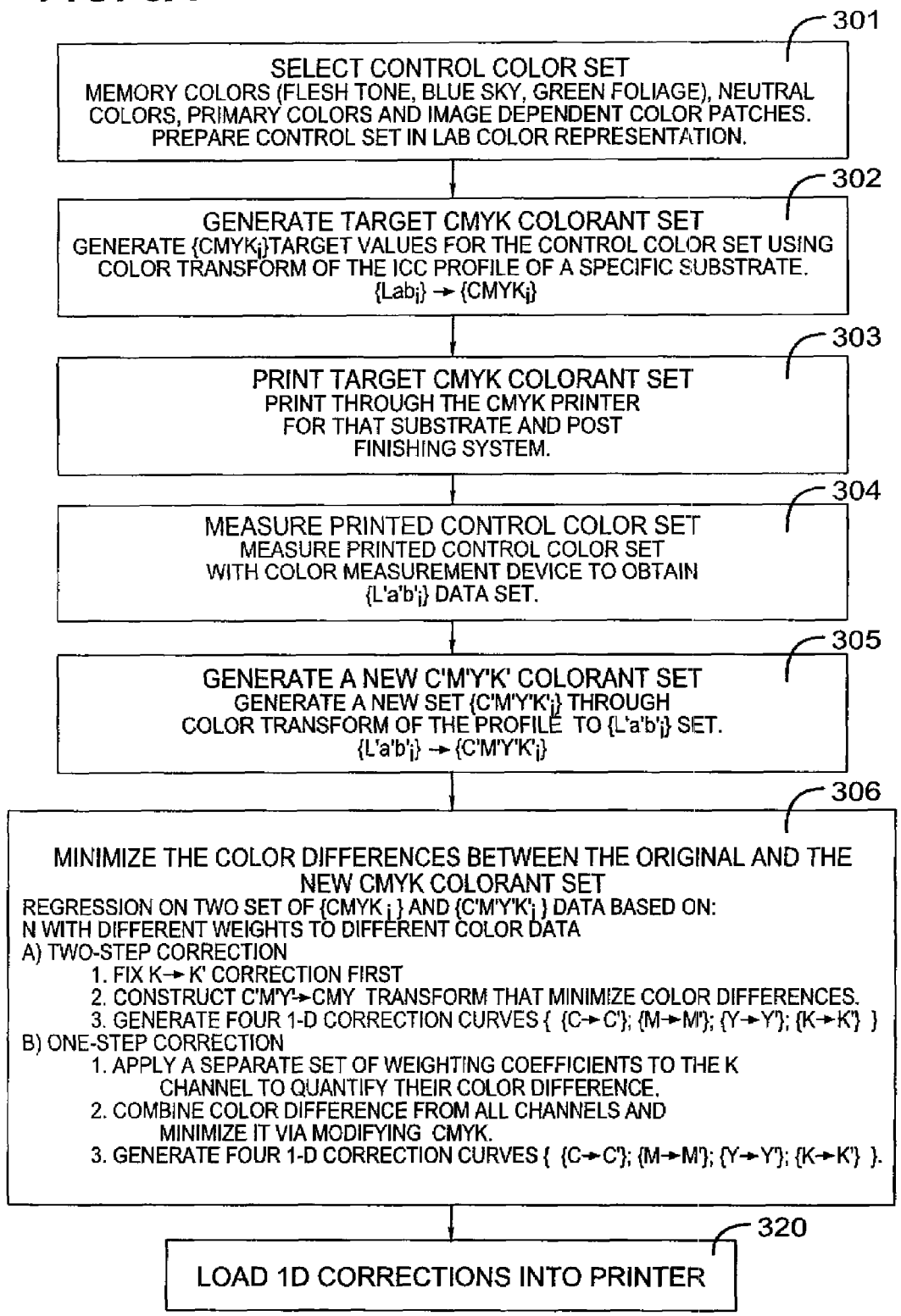
FIG. 3A is a flow chart illustration of a process steps according to one aspect of the invention.

FIG. 3A describes an embodiment of the color enhancement method and system. The process-sensitive automatic color correction is performed in the device-dependent color space as shown in the process steps of FIG. 3A, 301, 302, 303, 304, 305, 306, and 320. One skilled in the art would understand that all the steps involved could be programmed to occur automatically or combined with suitable operator interface controls. The select control color set 301 can include all the process-sensitive colors and image dependent color patches. Process sensitive colors include the memory sensitive colors such as flesh tone colors, blue sky colors, green foliage colors as well as neutral colors, and primary colors. The process sensitive colors of interest are selected and used as the target colors for adjusting the color reproduction printing system. These control colors should be in the LAB color specification. Next, in process step 302, the target CMYK colorant set is generated to use for the color transformation of the ICC profile for a specific substrate represented by $\{L\ a\ b_i\} \rightarrow \{CMYK_i\}$. This $\{L\ a\ b\}$ color set was prepared or transformed through the backward color transformation shown in FIG. 7 and discussed later in conjunction to step 701. This {CMYK} colorant set is the target color specification, also known as a target color also sometimes referred to as a reference color or a desired color or even as the "aim". The following table from the Kuang reference discussed above is an example of the memory sensitive data that could be used.

| Category | L* | a* | b* |
|---|---|---|---|
| Caucasian Skin Indoor w/Flash | 56 | 22 | 29 |
| Caucasian Skin Indoor w/o Flash | 64 | 27 | 38 |
| Caucasian Skin Outdoor | 72 | 20 | 20 |
| Caucasian | 64 | 27 | 38 |
| Asian | 74 | 12 | 22 |
| Indian | 55 | 23 | 30 |
| African | 40 | 18 | 29 |
| Sky (desert) | 50 | −2 | −46 |
| Sky (grass) | 54 | −2 | −44 |
| Sky (snow) | 61 | −4 | −43 |
| Grass (field) | 49 | −33 | 51 |
| Grass (golf) | 59 | −31 | 41 |
| Grass (house) | 42 | −30 | 42 |

Next the target CMYK colorant is printed as shown in step 303. The target color set is printed on a substrate along with any required post-processing such as with a gloss finishing system.

Next the post-finishing printed control printed target CMYK colorant set is measured in the 304 measurement step using a measurement device such as a colorimeter, spectrophotometer or flat bed scanner. One skilled in the art would understand that there are other color measurement devices that could also be used if they are capable of generating a new set of {L' a' b'}. There differences between the original {L a b} color set and the new {L'a'b'} color set of each selected color can be caused by the color shifts or color deviations due to printing system variations or even due to the viewers perception. The larger the color deviations, the larger the differences in perceived color. The new {L'a'b'} color set is color transformed to {C'M'Y'K'} colorant representation through the forward color transform 801 of the printer shown in FIG. 8 and discussed later in conjunction to step 801. The new {C'M'Y'K'} colorant set is generated in 305. Both colorant sets {CMYK} and {C'M'Y'K'} are from the original control colors and these represent the color deviations in device dependent CMYK color space before and after printing, including the post-finishing process.

Now in step 306, the differences between the original and the post-processing colorant set are minimized using a mathematical regression method with specific enhancement steps. This step using different weighted factors that are applied to the two colorant sets to minimize the color differences between the original and the new CMYK colorant while balancing the capabilities of the printer and post finishing device through the use of the pre-defined weighted values for each different color that is to be adjusted, as shown in FIG. 3A. Four 1-D correction curves are generated at the end of 306 step and the color correction can be performed through the adjustment of 1-D curve on each separation (i.e.; C'->C; M'->M; Y'->Y; K'->K) independently. The 1-D color corrections are loaded into printer in step 320 which adjust the color shifts back to its target color. These adjustment will not impact the rasterized image data output from the digital front end. The whole color reproduction printing system will then be re-calibrated to reproduce correct process-sensitive colors.

Figure 4:
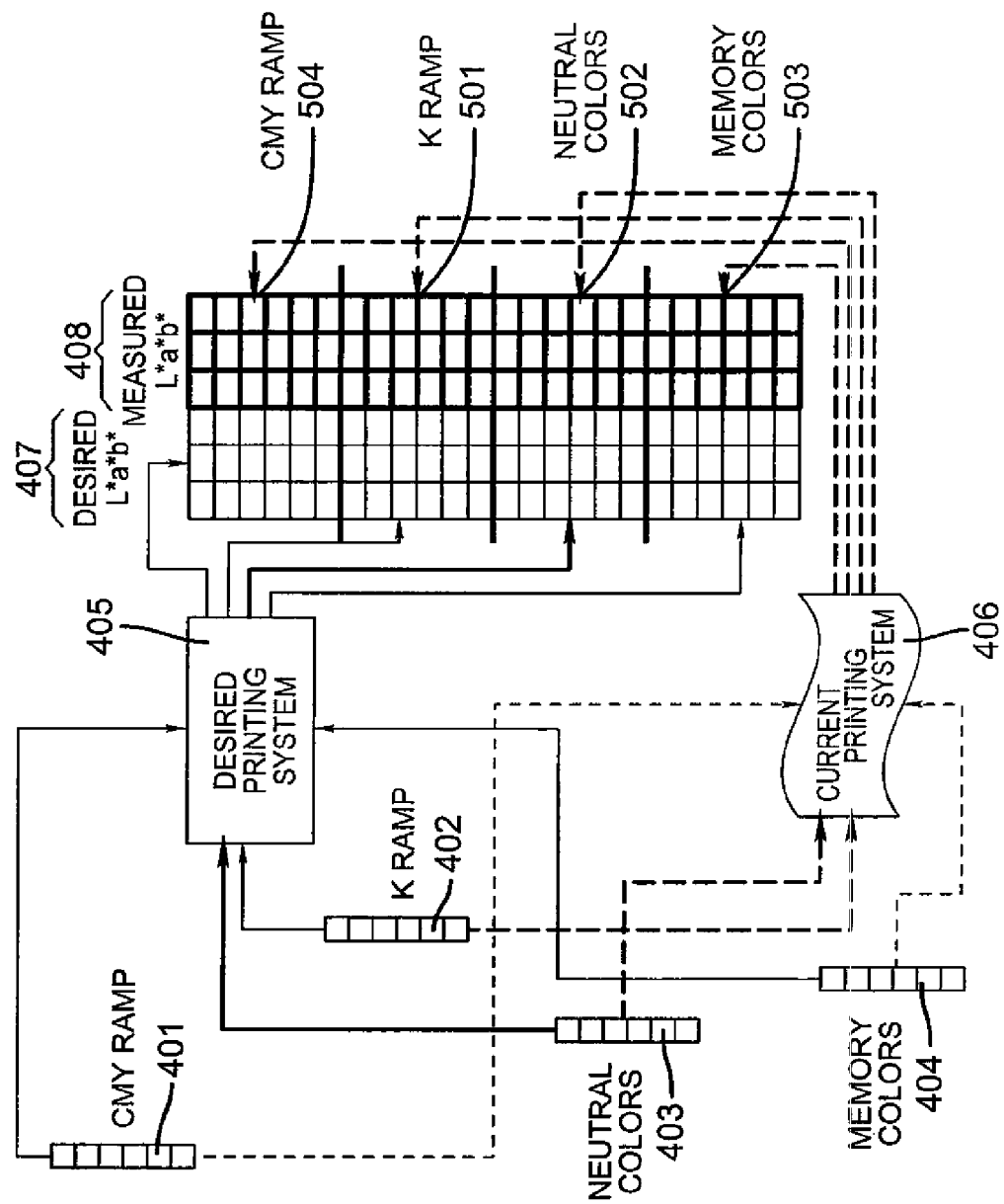
FIG. 4 is a schematic representation of a process that characterizes the color shift of desired printing system and current printing system.
Figure 5A:
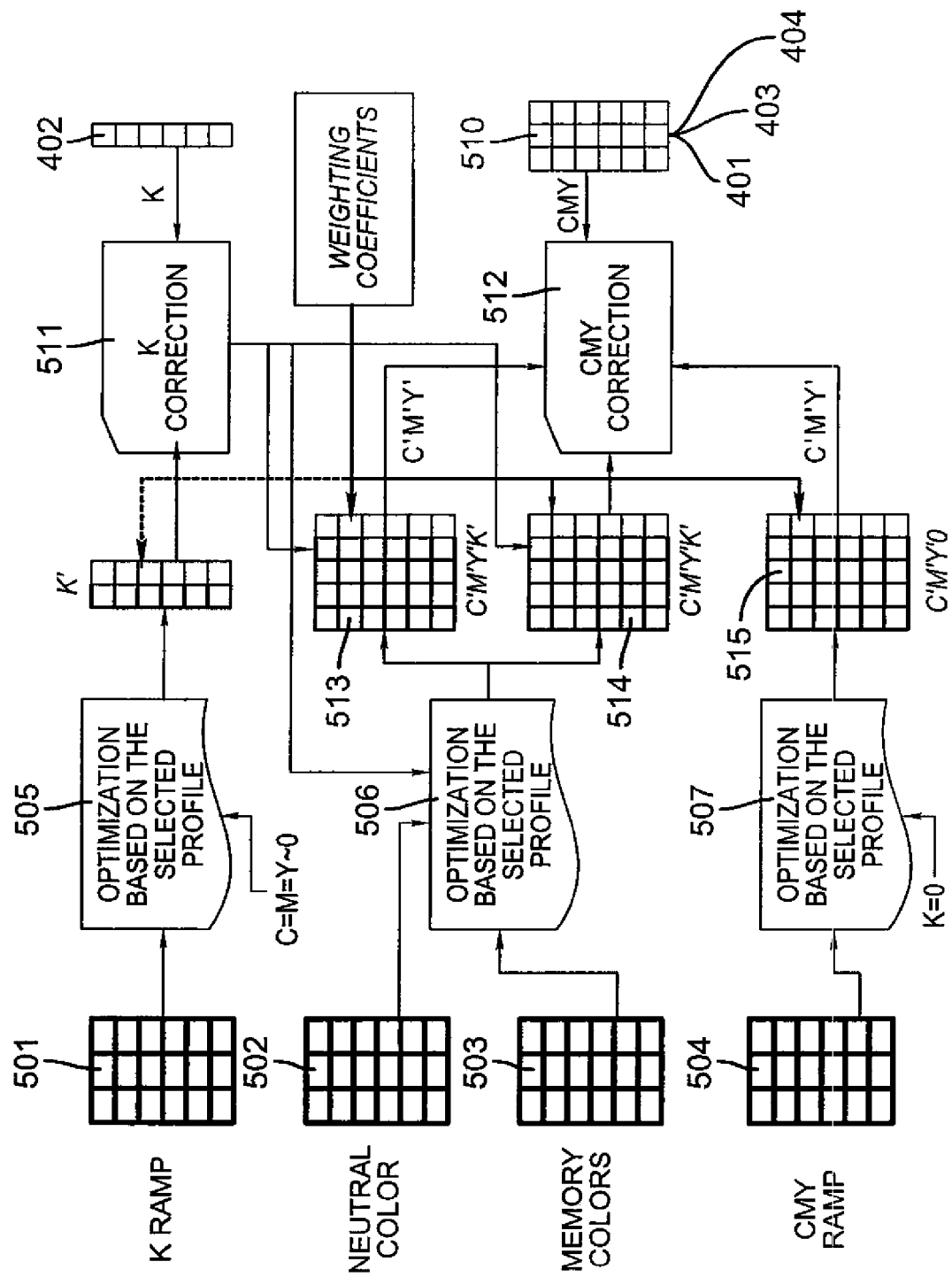
FIG. 5A is a schematic representation of a process according to FIG. 3 of the invention.
Figure 5B:
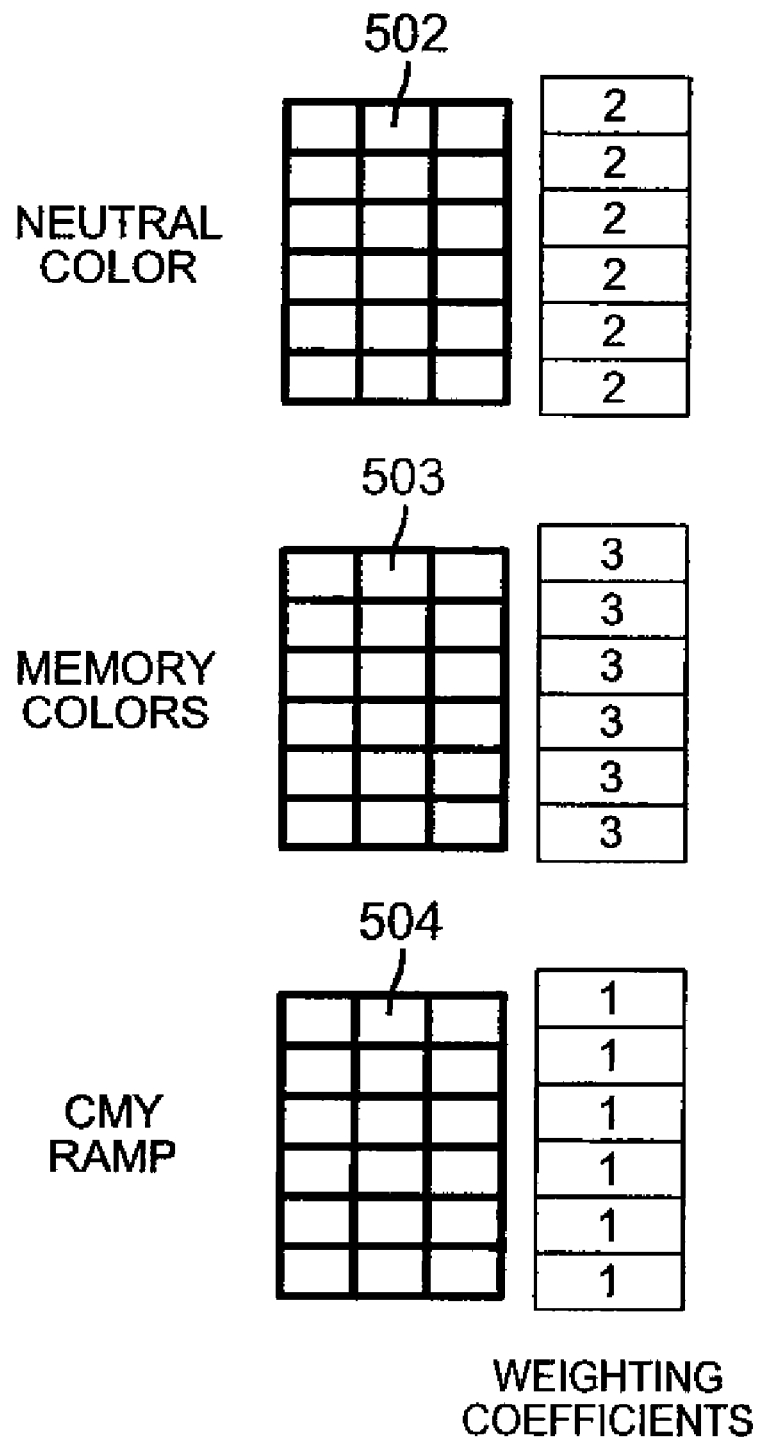
FIG. 5B is an example of weights assigning to different controlled color set.

In the regression process of the 306 step, the weights are assigned to each color according to individual preferences on the control color set (or on the evaluated images) (as illustrated in FIG. 5B as example). In this sense, the accuracy of local mapping around the emphasized color can be improved. For example, emphasizing more (giving more weights on those flesh tone colors) on flesh tone area if the evaluating image is a portrait image. Other memory colors correction can be less emphasized. Furthermore, to construct more accurate mapping between {CMYK} and {C'M'Y'K'} data sets in the regression process, an enhancement step is introduced, as will be discussed below in relation to FIGS. 4 and 5. The enhancement is to perform K->K' regression first. This fixes the black replacement choices between {CMYK} and {C'M'Y'K'} so that {CMY} and {C'M'Y'} mapping can be more accurately achieved. This two-step regression process maintains the black colorant of the original color transformation created in LAB->CMYK backward color transformation and minimize the color differences between the original and the new CMYK colorant in the 1-D color correction process. More detailed data flow diagram is illustrated in FIG. 5A.

Figure 3B:
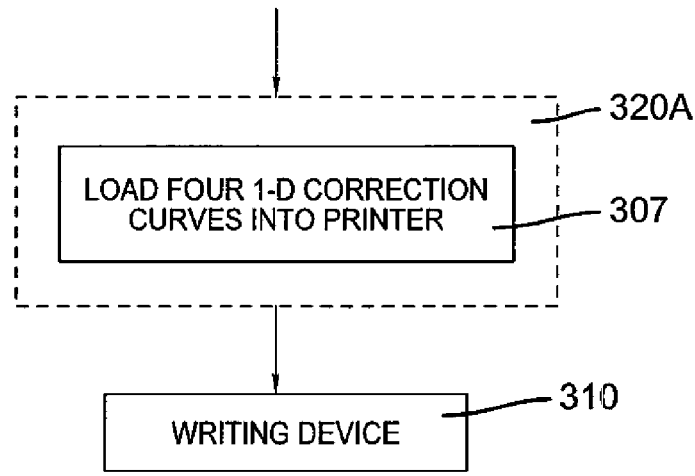
FIG. 3B is an illustration of loading different 1-D correction processes into a printer according to the invention illustrated in FIG. 3A.

FIG. 3B describes the first of two different 1-D correction processes to accomplish the step of loading the corrections, before printing them with a writing device 310, as described in 320 step of FIG. 3A. In step 320A, four 1-D correction curves that generated at step 306 are loaded into printer in the process step 307. These loaded values are used to replace the original characteristic curves in the printer. During this step it is important to remember that the original characteristic curves will be lost if they are not saved somewhere else in the printer. However, there is another means described in steps 308 and 309 of FIG. 3C that uses differential 1-D correction for each separation to readjust color back to its target color.

Figure 3C:
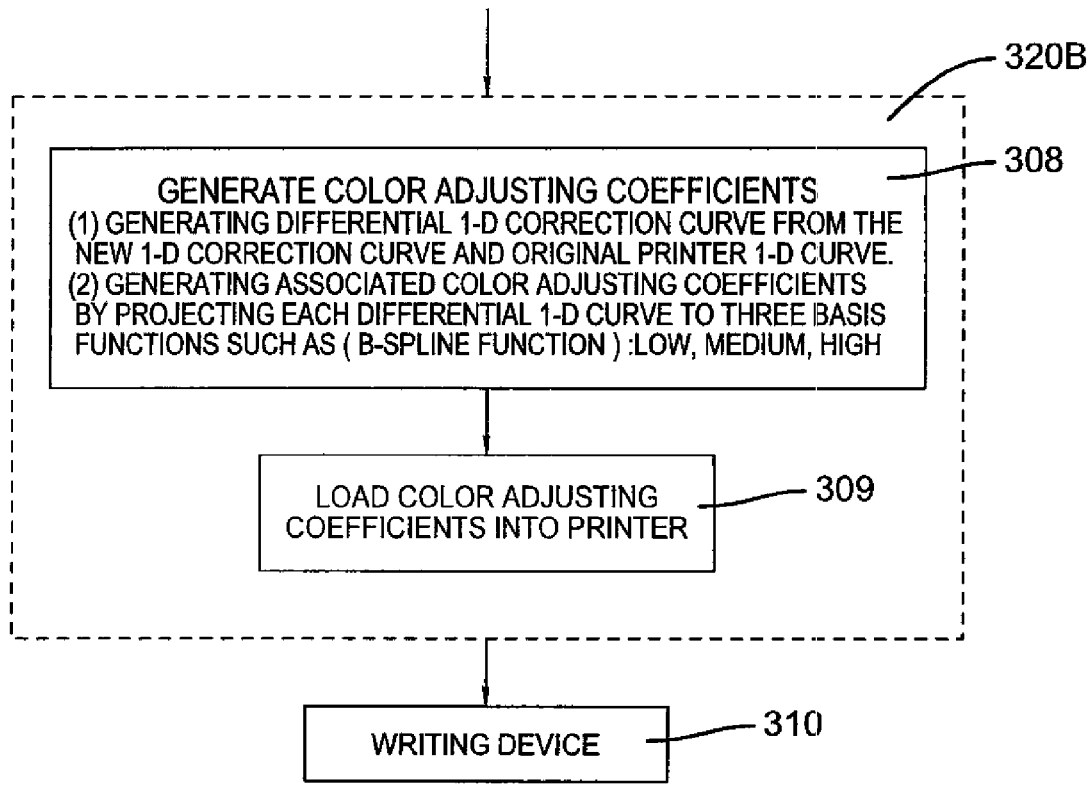
FIG. 3C is an illustration of loading different 1-D correction processes into a printer according to the invention illustrated in FIG. 3A.
Figure 11:
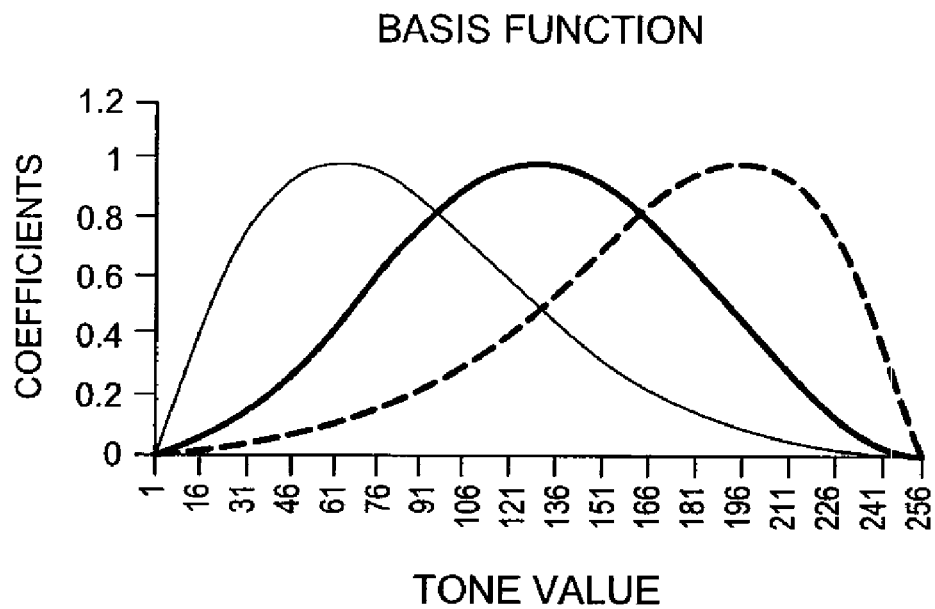
FIG. 11 is a three B-spline basis function illustration in accordance with this invention.
Figure 12:
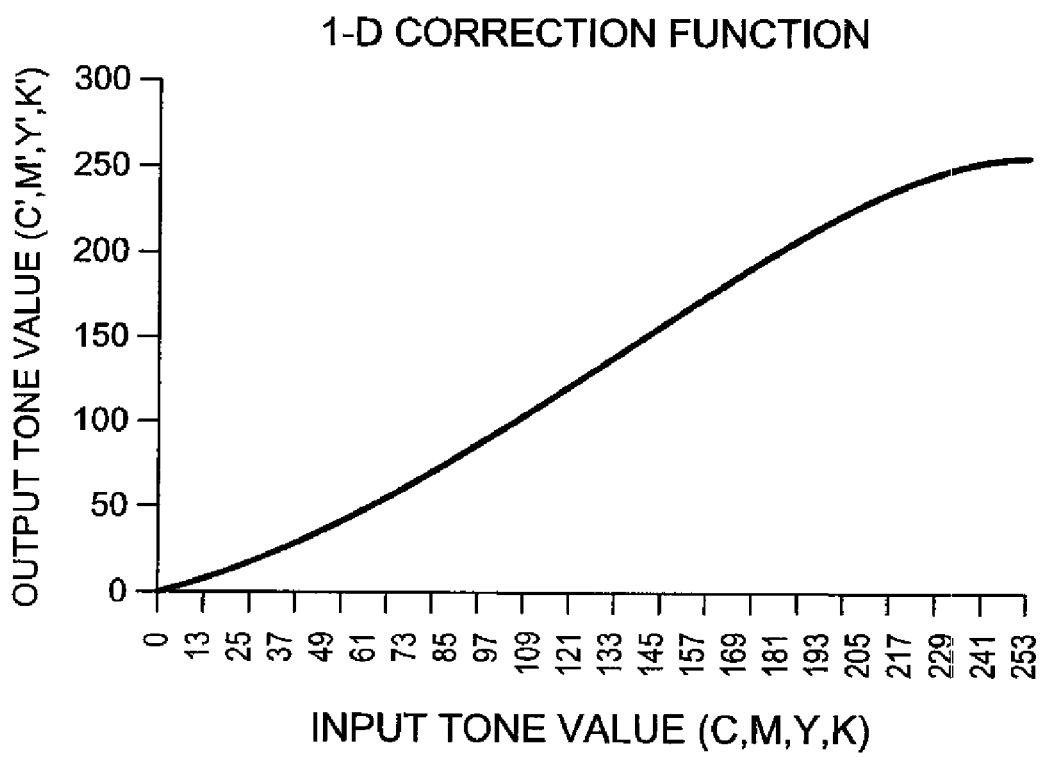
FIG. 12 is an illustration of a 1-D correction curve in accordance with this invention.

FIG. 3C step 320B illustrates how the difference 1-D curve can be alternately generated using differential 1-D correction curves. A 1-D curve of ΔC, ΔM, ΔY, ΔK is generated from the original and new correction curves (C'->C; M'->M; Y'->Y; K'->K). The set of ΔC, ΔM, ΔY, ΔK difference curves are further estimated to generate projected basis coefficients for each color, for example, a three-basis function such as a B-spline function having a low, medium, high content distribution. A B-spline function that can be used to accomplish this step is illustrated in FIG. 11. After the B-spline coefficients for each separation color are generated they are loaded in step 309 into writing device 310. During the step 308 the original 1-D curves (C0,M0,Y0,K0) are adjusted by the difference values ΔC, ΔM, ΔY, ΔK that were re-constructed from the projected basis coefficients to the modified 1-D curve. Other basis functions besides a B-spline basis function can be used as long as it produces the accuracy necessary.

Figure 9A:
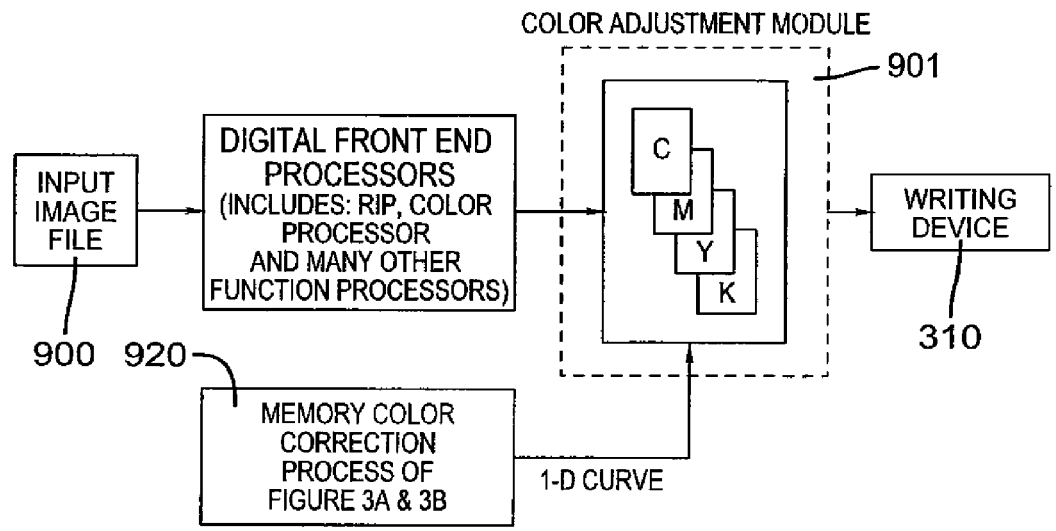
FIGS. 9A & 9B is block diagram of the color correction process of the first embodiment in the printing process.
Figure 9B:
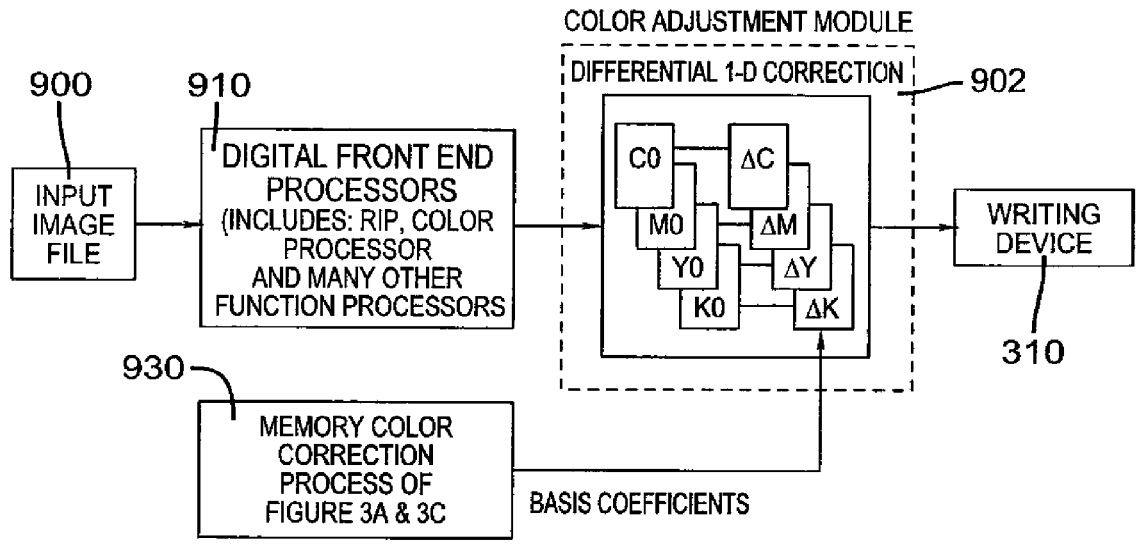

FIG. 9A & FIG. 9B show color adjustment modules 901, 902 corresponding to each of the two methods described in FIGS. 3A and 3B and 3A and 3C respectively. The loading 1-D color adjustment steps 307 and 309 are shown at 920 and 930 of FIGS. 9A and 9B respectively. FIG. 9A and FIG. 9B show the input image file 900, including the original colorant set being processed by the front end processors 910 including RIP, color processor and other function processors before the corrected colorant sets are entered into the color modules 901, 902 located in the LCU 12 before they are printed by the writing device 310. As is shown by FIGS. 9A and 9B, the color adjustment module is independent of digital front-end processors 910. The image data will not need to be re-rasterized after the corrected colorant sets are generated.

FIG. 4 is a schematic representation of the first embodiment for the perceived difference among all selected color patches, such as 401, 402, 403, and 404, is illustrated in FIG.

5A. The Desired Printing System 405 is the state of a printing system at the time of generating the associated ICC profiles, which characterize color printers. The Current Printing System 406 represents the current state of that system which is assumed to be different from 405. Based on the prior information characterized in the ICC profile, the set of target color(s) 407, in the device independent space CIELAB can be readily obtained. After the current system 406 prints the selected patches 401~404, their colors can then be measured, resulting in the measured colorant set in L* a* b* space 408. Hence, the color difference associated each color patch can be computed based on 407 and 408.

FIG. 5A shows a two-step process where the corrected K is determined first before CMY is corrected. A one-step process could achieve a similar result by extending the weighting coefficients to the K channel, as indicated by the dashed line in FIG. 5A, during the minimization process. The schematic shown in FIG. 5 is the process diagram and data flow for correcting the colorant composition for the first embodiment of the invention. As is shown, the weight coefficient given the K table could be anything including the highest weight. The first step in the correction process shown in FIG. 5A is to identify the mapping between K and K' to achieve a unique solution (as was shown in step 306 before) before proceeding with the following CMY->C'M'Y' correction steps. The state of the current printing system is characterized by the measured color sets 501, 502, 503 and 504. In current commercial printing generally four colorants are used individually or simultaneously to represent the desired color in Lab representation. Since the desired printing system is represented by the existing color transforms or the associated ICC profile that characterize the system, the new colorant combinations, {C'M'Y'K'}, can be computed under certain constraints as indicated in 505, 506 and 507. The optimization procedures with various constraints accordingly, 505, 506 and 507, is to modify the combination CMYK colorants to achieve the intended color Lab value measured in ΔE color errors, which could be defined as $(\Delta L^2+\Delta a^2+\Delta b^2)^{(0.5)}$ based on the color transforms in the selected ICC profile or LUT. In 505, because only K colorant is present in achieving black ramp color 501, an optimization routine is performed under the constraint that C, M and Y colorant values are approximately zero, and results in a new set of {K'}. One skilled in the art would understand that other criteria could be used to determine what to minimize.

Therefore, a black K-correction algorithm 511 is designed to compute and generate the mapping function from K to K' based on black ramp color 402 and 501. This updated K' component will then be fed into the optimization procedure 506 as the constraint in the K component where the color set 502 and 503 usually contains all four CMYK colorants. The resulted C'M'Y' values are more accurately achieved in the color set 502, 503. At last, the constraint optimization procedure 507 is to confine K to be zero because CMY ramp contains no K components. After completing optimization procedures 505, 506 and 507, the CMY correction regression algorithm 512, is responsible to compute and generate the desired three CMY 1-D mapping functions to achieve C->C', M->M' and Y->Y' based on the assigned weighting coefficients (illustrated in FIG. 5B) between the new colorant set for neutral colors 513, the set for memory-sensitive colors 514 and the set for CMY colors 510 (see the corresponding steps in FIG. 4 which include 401, 403 and 404). These four 1-D correction curves are fed through color adjustment module 901 in the printer. In a similar manner additional colors can be mapped. For example a five color system with the colors CMYKF (where F is the fifth color) can be corrected in the same manner as described above. It would be clear to one skilled in the art that this method is not limited to a four color system and can work in conjunction with a plurality of colors and finishing systems.

Figure 6A:
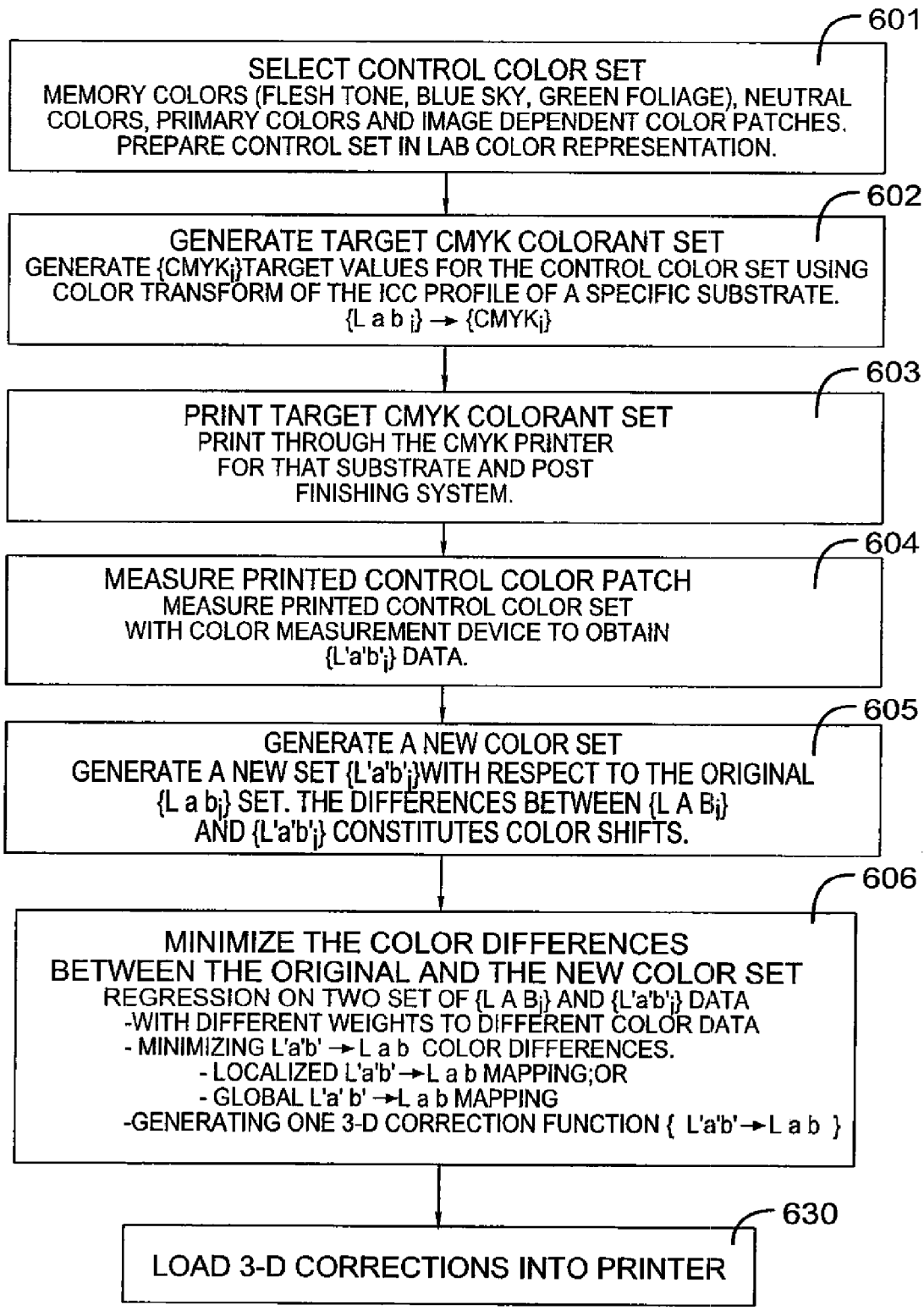
FIG. 6A is a flow chart illustration of process steps according to another aspect of the invention.
Figure 6B:
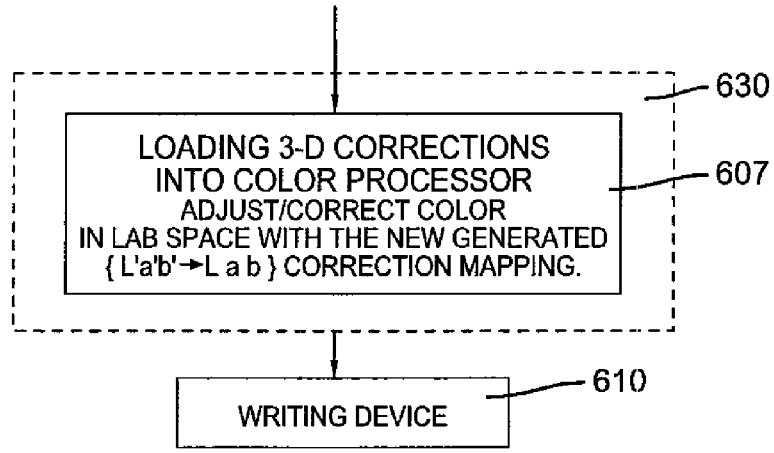
FIG. 6B An illustration of loading 3D corrections according to the invention described in FIG. 4A.

FIG. 6A shows a flow chart representing another embodiment of the color enhancement method and system. In this embodiment the process-sensitive color correction is performed in the device-independent LAB color space instead of the device-dependent LAB color space described in the prior examples. Color corrections are made in the process steps 601, 602, 603, 604 as shown in FIG. 6. All of these steps, except steps 605 and 606, are described above as the process steps 301, 302, 303, 304 of FIG. 3A. In the new step 605, two sets of colors in device-independent color space representation, the target colors {L a b} and the measured new colors {L'a'b'} are generated from the original control colorant set and have a regression applied to the resultant data in step 606. Then in the 606 step, different weights are assigned to each color according to individual preferences on the control color set (or on the evaluated images) as discussed above. The regression constructs a 3×3 mapping model from {L'a'b'} to {L a b} at the end of step 606. The constructed 3×3 mapping model can be represented in 3-D LUT form. The 3-D LUT correction table is loaded into the writing device 610 in step 630 for color correction as further illustrated in FIG. 6B. During the regression process, two different mapping models, the localized L'a'b'->L a b mapping model or the global L'a'b'->L a b mapping model can be constructed and used. In localized L'a'b'->L a b mapping, only the targeted regional LAB spaces are affected and other regional LAB spaces are unaffected. In global L'A'B'->LAB mapping, the whole LAB space is affected.

Figure 10:
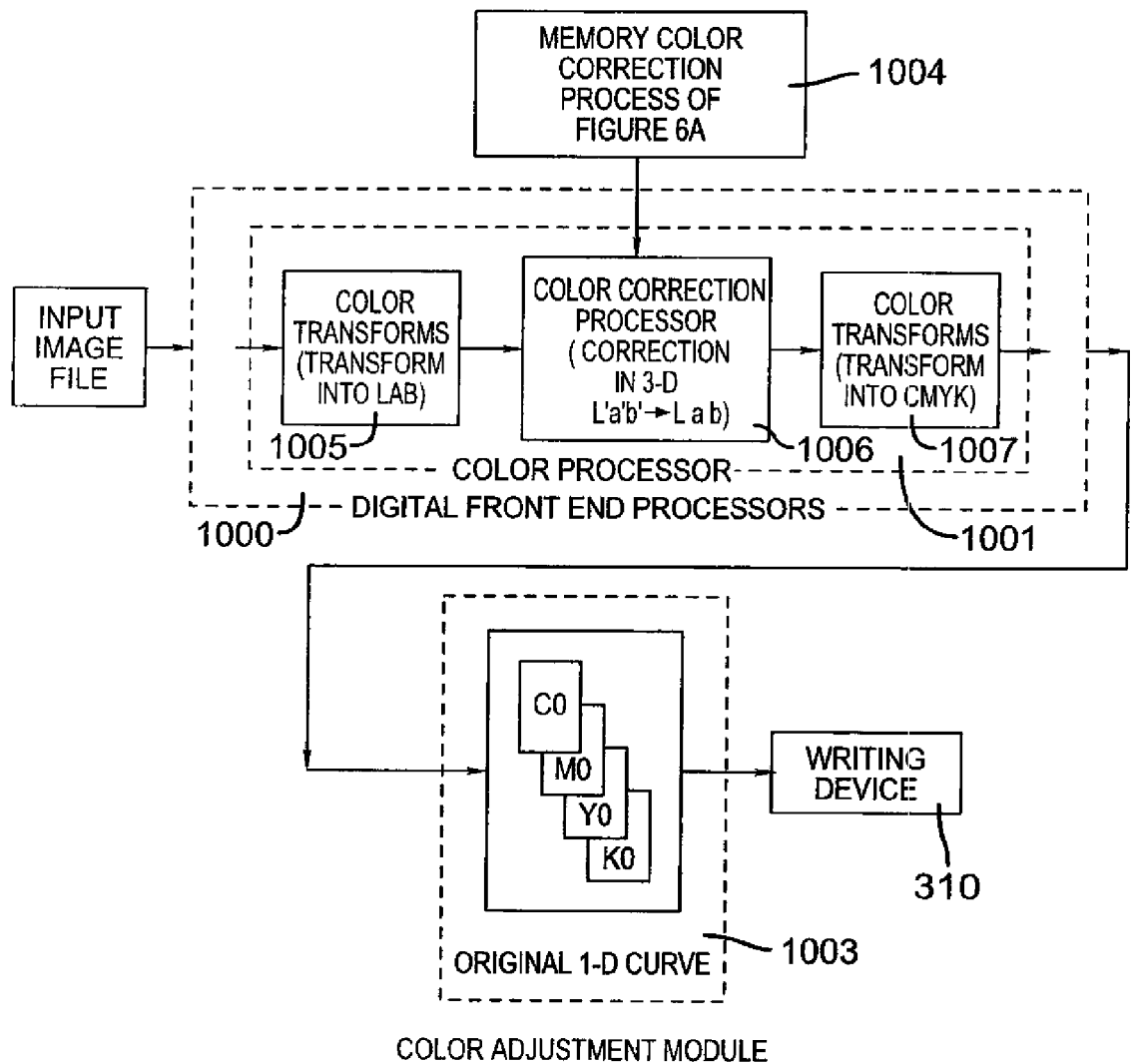
FIG. 10 is a block diagram of the color correction process of second embodiment in the printing process.

After the 3-D correction values are generated, the L'a'b'->Lab mapping look-up table (LUT) is loaded in the color processing data flow step 607 of FIG. 6B or described again in RIP/color processor 1001 of FIG. 10. This embodiment has a different color correction process compared with the first embodiment. The color correction data flow of the second embodiment is illustrated in FIG. 10. The memory color correction process step 1004 represents the new colorant set corrections and is interfaced with the color processor 1001 in the digital front-end processors 1000. The 3-D correction LUT is loaded into color processor 1001 and carried out by color correction processor 1006. The color processor 1001 also includes the color transforms 1005 which converts the device-dependent CMYK color space values to device-independent LAB color space values and other color transforms 1007 which convert device-independent LAB color space values to device-dependent CMYK color space values and 3-D correction color is performed in device-independent LAB color space using the correction processor 1006.

Both of the embodiments discussed above-described color correction processes to automatically correct process-sensitive colors, such as memory sensitive colors, using the steps discussed in conjunction with FIGS. 4 and 5. All or some of these steps can be stored in the printer's LCU memory. It would be clear to one skilled in the art that some of these steps could be replaced with suitable operator interactive controls.

The claims should not be read as limited to the described order or elements unless stated to that effect. In addition, use of the term "means" in any claim is intended to invoke 35 U.S.C. §112, paragraph 6, and any claim without the word "means" is not so intended.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

The invention claimed is:

1. A method for recalibrating a multi-color imaging system wherein the imaging system is capable of outputting corrections by including weight-adjusted coefficients on process-sensitive memory color colors based on selected input target color values, the method comprising:
   a. forming selected input target process-sensitive color combinations, wherein one or more of the process-sensitive color combinations includes at least two different colors including a human sensitive memory color; measuring color values for each of the different color combinations of process-sensitive colors;
   b. comparing each of the measured color values to values corresponding to the input target color values that represent a desired condition of the imaging system;
   c. calculating an error value that represents a deviation of the measured color values from the input target color values;
   d. assigning weight-adjusting coefficients on one or more of the input target color values to reduce the error value to a predetermined degree, wherein the adjustment of the input target color values for one of the colors is performed independently of the adjustment of the input target color values for others of the colors and continued as needed to make all the corrections needed to match the input target process-sensitive color combinations; and
   e. further assigning weight-adjusting coefficients on one or more of the input target color values comprising the human sensitive memory color to reduce the error value to a predetermined degree, wherein the weight adjustment of the input target color values for one of the colors is performed independently of the weight adjustment of the input target color values for others of the colors such that error values for the human sensitive memory color are less than the other error values and continued as needed to make all the corrections needed to match the target color sensitive color combinations weight coefficients.

2. The method of claim 1, wherein the forming step includes forming one or more of the process-sensitive color combinations by a combination of at least three of the different colors starting with black.

3. The method of claim 1, further comprising a two step process including first performing the comparing, calculating and weight-adjusting step for the color black (K) and then doing the same for the other colors (CMY).

4. A method for recalibrating a multi-color imaging system wherein the imaging system is capable of outputting corrections by including weight-adjusted coefficients on both process-sensitive and memory-sensitive colors without intervention based on selected input target color values, method comprising:
   a. Selecting an original process-sensitive color set of process-sensitive colors in LAB color space;
   b. Generating a first process-sensitive target colorant set of target process-sensitive colors in CMYK space and a second memory-sensitive target colorant set of memory-sensitive colors [colorant set] in CMYK space;
   c. Printing the target process-sensitive and memory-sensitive colorant set in CMYK space for a specific substrate using an applicable post finishing system;
   d. Measuring a printed process-sensitive and a print memory-sensitive colorant set with a measurement device to obtain L'A'B' data set;
   e. Generating a new target process-sensitive and memory-sensitive colorant set in C'M'Y'K' space though a color transform using the measured L'A'B' data set;
   f. Minimizing the color differences between the original color set of colors (CMYK) and the new target colorant set (C'M'Y'K') by applying a regression on each of the two sets using assigned weighted coefficients for both the different process-sensitive and memory-sensitive colors such that the error values for the memory-sensitive colors are less than the other error values; and
   g. Loading the corrections resulted from minimization process into the printer.

5. The method of claim 4, further comprising fixing the weighted coefficient for one separation color first and then applying the weighted coefficients for the other separation colors.

6. The method of claim 4, further comprising fixing the weighted coefficient for first process-sensitive target and then applying a weighted group coefficient for one or more groups, the groups including memory sensitive colors, neutral colors, black, and primary colors.

7. The method of claim 5, wherein the weighted coefficient for at least two colors is the same.

8. The method of claim 5, further comprising generating a 1-D correction curve for one of the separations colors.

9. The method of claim 5, further comprising generating a 3-D correction curve for one of the separation colors.

10. The method of claim 5, further comprising generating four 1-D correction curves, one for each of the separation colors CMYK.

11. The method of claim 10, further comprising generating four differential 1-D correction curves from the four 1-D correction curves, one for each of the separation colors CMYK and from the original printer curves and then generating the associated correction coefficients for that separation color by projecting each differential 1-D curve to a three basis function resulting in a low, medium and high value.

12. A method for recalibrating a multi-color imaging system wherein the imaging system is capable of outputting corrections by including weight-adjusted coefficients on color sensitive colon, with suitable operator interactive controls, based on selected input target color values, the method comprising:
   a. Selecting an original color set of color sensitive colors in LAB color space;
   b. Generating a target color sensitive colorant set in CMYK space;
   c. Printing the target color sensitive colorant set in CMYK space for a specific substrate using an applicable post finishing system;
   d. Measuring the printed color -sensitive colorant set with a measurement device to obtain L'A'B' data set;
   e. Generating a new target color -sensitive colorant set in C'M'Y'K' space though a color transform using the measured L'A'B' data set;
   f. Minimizing the color differences between the original color set of color sensitive colors (CMYK) and the new target color sensitive colorant set (C'M'Y'K') by applying a regression on the two sets using assigning weighted coefficients the different color sensitive colors such that error values for the memory-sensitive colors are less than the other error values;

g. Loading the corrections resulted from minimizing process into the printer.

13. The method of claim 4, further comprising fixing the weighted coefficient for one separation color first and then applying the weighted coefficients for the other separation colors in the minimizing process.

14. The method of claim 12, further comprising fixing the weighted coefficient for first group and then applying a weighted group coefficient for one or more groups, the groups including memory sensitive colors, neutral colors, black, and primary colors.

15. The method of claim 13, wherein the weighted coefficient for at least two colors is the same.

16. The method of claim 13, further comprising generating a 1-D correction curve for one of the separation colors.

17. The method of claim 13, further comprising generating a 3-D correction curve for one of the separation colors.

18. The method of claim 5, further comprising generating four 1-D correction curves, one for each of the separation colors CMYK.

19. The method of claim 18, further comprising generating four differential 1-D correction curves from the four 1-D correction curves, one for each of the separation colors CMYK and from the original printer curves and then generating the associated correction coefficients for that separation color by projecting each differential 1-D curve to a three basis function resulting in a low, medium and high value.

20. A computer readable medium encoded with a computer program arranged such that, upon execution of the computer program, a processor performs a method for recalibrating a multi-color imaging system, the imaging system configured to correct output colors based on corresponding input target color values, the method comprising:

forming target color sensitive color combinations, wherein one or more of the color sensitive color combinations includes at least two different colors, including a human sensitive memory color;

measuring color values for each of the different color combinations of color sensitive colors;

comparing each of the measured color values to corresponding to the input target color values that represent a desired condition of the imaging system;

calculating an error value that represents a deviation of the measured color values from the input target color values comprising an error value for each measured color including an error value for the human sensitive memory color; and assigning weight-adjusting coefficients on one or more of the input target color values to reduce the error value to a predetermined degree, wherein the weight adjustment of the input target color values for one of the colors is performed independently of the weight adjustment of the input target color values for others of the colors such that error values for the human sensitive memory color are less than the other error values and continued as needed to make all the corrections needed to match the target color sensitive color combinations.

* * * * *